US012759144B2

(12) United States Patent
Katsuhisa

(10) Patent No.: US 12,759,144 B2
(45) Date of Patent: Oct. 13, 2026

(54) ROBOT CONTROL DEVICE AND CONTROL METHOD

(71) Applicant: FANUC CORPORATION, Yamanashi (JP)

(72) Inventor: Hiroshi Katsuhisa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 57 days.

(21) Appl. No.: 18/846,654

(22) PCT Filed: Apr. 8, 2022

(86) PCT No.: PCT/JP2022/017421
§ 371 (c)(1),
(2) Date: Sep. 13, 2024

(87) PCT Pub. No.: WO2023/195177
PCT Pub. Date: Oct. 12, 2023

(65) Prior Publication Data
US 2025/0042025 A1 Feb. 6, 2025

(51) Int. Cl.
*B25J 9/16* (2006.01)
*B25J 13/08* (2006.01)

(52) U.S. Cl.
CPC ........... *B25J 9/1651* (2013.01); *B25J 13/085* (2013.01)

(58) Field of Classification Search
None
See application file for complete search history.

(56) References Cited

U.S. PATENT DOCUMENTS 10,464,210 B2 * 11/2019 Haddadin .............. B25J 13/085
2013/0184869 A1 * 7/2013 Inazumi ................. B25J 9/1633
700/260
2016/0089790 A1 * 3/2016 Wang ..................... B25J 9/1694
700/255
2016/0176052 A1 * 6/2016 Yamamoto ............. B25J 9/1676
901/49
2017/0239815 A1 * 8/2017 Haddadin .............. B25J 19/063
2017/0285625 A1 * 10/2017 Sato ....................... B25J 9/1633
2018/0126562 A1 * 5/2018 Inaba ............... G05B 19/41815
2018/0200881 A1 * 7/2018 Ishii ......................... B25J 19/06
2019/0389052 A1 * 12/2019 Adachi .................... B25J 13/08
2020/0070342 A1 * 3/2020 Hannya .................. B25J 9/1633
2020/0122323 A1 * 4/2020 Inaba ..................... B25J 9/1694
2021/0077069 A1 * 3/2021 Beacham ............... A61B 8/085
2021/0128384 A1 * 5/2021 Lee .......................... A61G 7/08
2021/0237261 A1 * 8/2021 Kinoshita .............. B25J 9/0081
2022/0250243 A1 * 8/2022 Ibi .......................... B25J 9/1664
2023/0001568 A1 * 1/2023 Vannuffelen ........... B25J 19/063

FOREIGN PATENT DOCUMENTS

JP 2015-202534 A 11/2015
JP 6316909 B1 4/2018
JP 2018-111174 A 7/2018
JP 2019-188531 A 10/2019
WO 2012101956 A1 8/2012

* cited by examiner

*Primary Examiner* — Ryan Rink
(74) *Attorney, Agent, or Firm* — HAUPTMAN HAM, LLP

(57) ABSTRACT

Provided is a robot control device for controlling a robot, the robot control device comprising a speed control unit for changing the operation speed of the robot in response to detection of a prescribed external force being applied to the robot when the robot is operating in accordance with a control program.

10 Claims, 6 Drawing Sheets

ROBOT CONTROL DEVICE AND CONTROL METHOD

RELATED APPLICATIONS

The present application is a National Phase of International Application No. PCT/JP2022/017421 filed Apr. 8, 2022.

FIELD

The present invention relates to a robot controller and a control method.

BACKGROUND

Cooperative robot systems in which a robot shares workspace with humans without a safety fence has been known. In such a cooperative robot system, human safety is generally ensured by stopping the robot automatically when contact between the robot and a human is detected by the robot.

PTL 1 relates to direct teaching, and describes as follows: "In a robot system 11, when an operator 60 applies a force (external force) to a tip portion 58 of a robot 50, a robot controller 10 controls an actuator for moving each axis of the robot 50 based on the force applied to the tip portion 58 of the robot 50 measured by a force measurement unit 21, data which has been set, and position data of the robot 50, etc., whereby the position of the axes constituting the robot 50 is changed and the robot 50 is moved." (paragraph 0019).

PTL 2 relates to a simulation device of a cooperative robot, and describes as follows: "A simulation device 50 for a simulation of cooperative task carried out cooperatively by a cooperative robot and a person, the simulation device includes a head-mounting display device 80 to be mounted on an operator to simulatively carry out the cooperative task, a detection unit 70 configured to detect a position of the operator in a real space, a three-dimensional model display unit 502 configured to display, on the head-mounting display device, an image in which a robot system model including a cooperative robot model is arranged in a three-dimensional virtual space, and a simulation execution unit 503 configured to simulatively operate the cooperative robot model in the three-dimensional virtual space based on a motion program of the cooperative robot to carry out the cooperative task and the detected position of the operator." (abstract).

PTL 3 relates to direct teaching of a robot, and describes as follows: "A robot arm (100) includes a grip part (103) which is structured to be separated from an end effector (102) attached to the robot arm (100). When the grip part (103) is gripped by a user and shifted, the robot arm (100) shifts tracking the grip part (103). Further, the grip part (103) includes a contact sensor (105), and the tracking control method is switched according to the value of the contact sensor (105)." (abstract).

PTL 4 relates to a cooperative robot, and describes as follows: "A human cooperative robot system (1) includes a first detection unit (S1) that detects an external force acting on a robot, a second detection unit (S2) that detects only an operating force acting on the robot when a person manually operates the robot, and a safety assurance operation command unit (21) that when the external force detected by the first detection unit exceeds a predetermined threshold value, outputs a safety assurance operation command for causing the robot to move in a direction that reduces the external force or causing the robot to stop." (abstract).

CITATION LIST

Patent Literature

[PTL 1] Japanese Unexamined Patent Publication (Kokai) No. 2015-202534 A
[PTL 2] Japanese Unexamined Patent Publication (Kokai) No. 2019-188531 A
[PTL 3] International Patent Publication No. WO2012/101956 A1
[PTL 4] Japanese Unexamined Patent Publication (Kokai) No. 2018-111174 A

SUMMARY

Technical Problem

Herein, instead of the teaching stage of a cooperative robot, the actual operation stage where the cooperative robot executes a control program and cooperatively performs a predetermined task with a worker, will be considered. During the actual operation of a robot system including such a cooperative robot, when a worker who cooperatively performs the task with the cooperative robot wishes to temporarily reduce a speed of the robot, the worker generally needs to stop the task and operate a teach pendant so as to set the motion speed of the robot. Further, the worker needs to operate the teach pendant again in order to return the reduced speed of the robot to the original speed. Such an operation is a troublesome operation for the worker, and also reduces the work efficiency. There is a demand for a robot controller and a control method which can change a speed of a cooperative robot in actual operation to a speed intended by a worker without the need to stop the task and operate the teach pendant.

Solution to Problem

One aspect of the present disclosure is a robot controller that controls a robot, and the robot controller includes a speed control unit configured to change a motion speed of the robot in response to detection of a predetermined external force being applied to the robot when the robot is operating according to a control program.

Another aspect of the present disclosure is a control method for controlling a robot by a robot controller, and the control method includes changing a motion speed of the robot in response to detection of a predetermined external force being applied to the robot when the robot is operating according to a control program.

Advantageous Effects of Invention

According to the configuration described above, the motion speed of the robot operating according to the control program can be changed by an operation of applying a force to the robot that is an intuitive and convenient operation for a worker.

The objects, the features, and the advantages, and other objects, features, and advantages will become more apparent from the detailed description of typical embodiments of the present invention illustrated in accompanying drawings.

DESCRIPTION OF EMBODIMENTS

Figure 1:
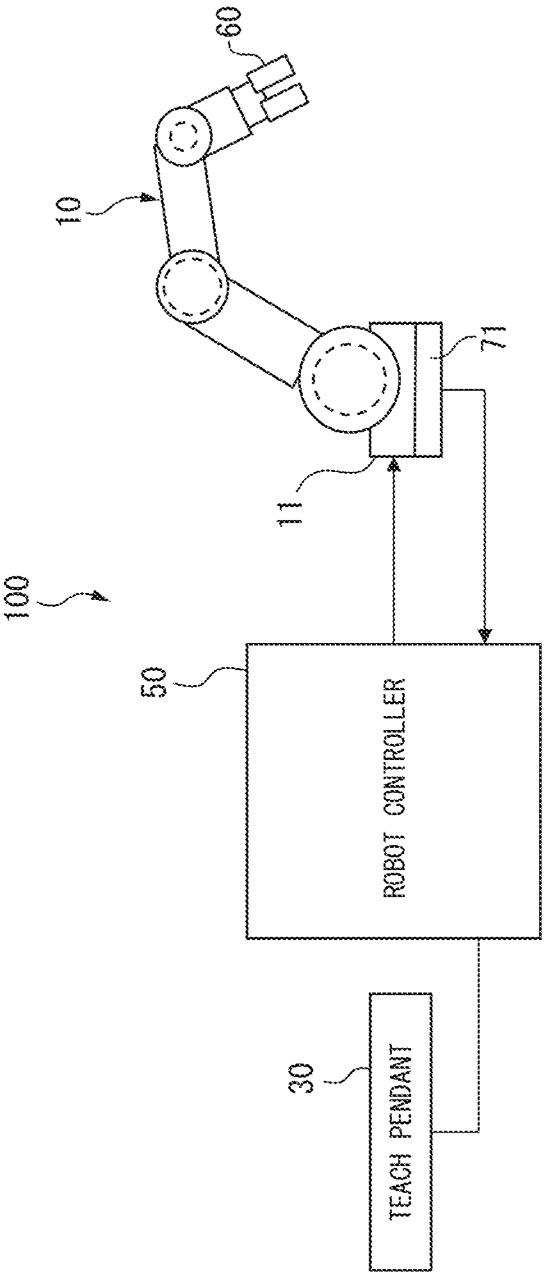
FIG. 1 is a diagram illustrating an apparatus configuration of a robot system according to an embodiment.

Next, embodiments of the present disclosure will be described with reference to drawings. A similar configuration portion or a similar functional portion is denoted by the same reference sign in the referred drawings. A scale is appropriately changed in the drawings in order to facilitate understanding. An aspect illustrated in the drawing is one example for implementing the present invention, and the present invention is not limited to the illustrated aspect.

FIG. 1 is a diagram illustrating an apparatus configuration of a robot system 100 according to an embodiment. The robot system 100 includes a robot 10, a robot controller 50 that controls the robot 10, and a teach pendant 30 connected to the robot controller 50. The robot 10 is configured as a cooperative robot that performs work in cooperation with a person. During an actual operation of the robot system 100, the robot controller 50 causes the robot 10 to perform predetermined work according to a control program loaded into the robot controller 50.

A worker who performs work in cooperation with a robot in a cooperative robot system may desire to temporarily change a speed of the robot operating according to a control program due to various factors in terms of the work. The robot controller 50 according to the present embodiment provides a function of changing a speed of the robot 10 operating according to the control program by an intuitive and convenient operation of applying a force to the robot 10.

The robot 10 includes a base 11 fixed to an installation floor. The robot 10 can perform desired work by using an end effector attached to a wrist portion of an arm tip of the robot. The end effector is an exchangeable external device according to use, and is, for example, a hand, a welding gun, a tool, and the like. FIG. 1 illustrates an example in which a hand 60 as one example of the end effector is used. The robot 10 is a vertical articulated robot in the present embodiment, but a robot of another type may be used.

The robot controller 50 controls a motion of the robot 10 according to a control program or a command from the teach pendant 30.

A force sensor 71 is disposed below the base 11 of the robot 10. The force sensor 71 is, for example, a 6-axis force sensor. The robot controller 50 can obtain an external force (contact force) acting on the robot 10 based on a detected value of the force sensor 71, and can detect that a person or an object contacts the robot 10. It should be noted that the robot controller 50 may also be configured to detect an external force (contact force) acting on the robot 10 by using a torque sensor disposed on each joint axis (or at least one of the joint axes) of the robot 10.

The teach pendant 30 is used for performing various settings related to teaching of the robot 10, program creation, and various operations for teaching such as a jog operation of the robot 10. It should be noted that an information processing device such as a tablet terminal and a personal computer (PC) including a teaching function may be used instead of the teach pendant.

Figure 2:
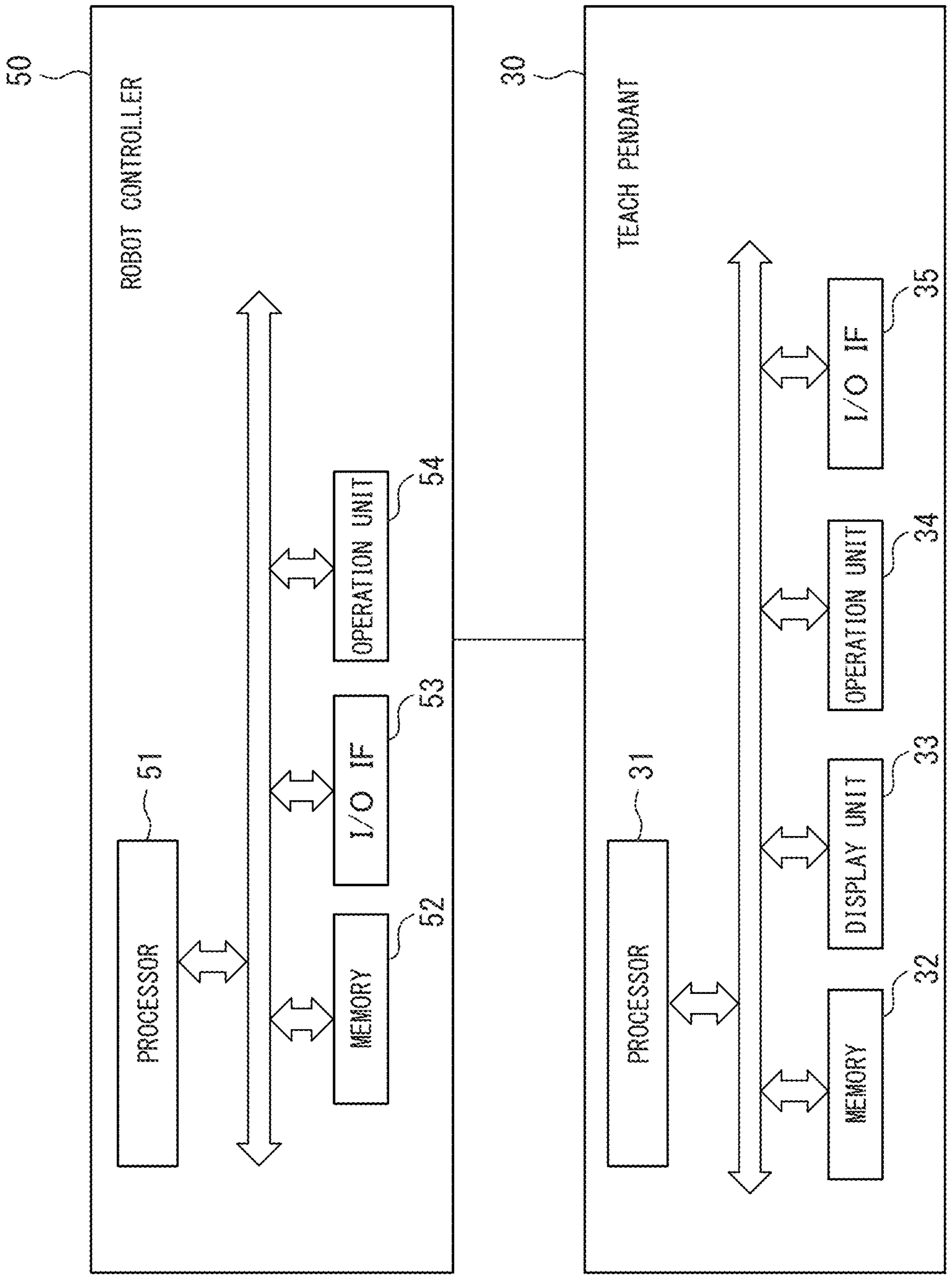
FIG. 2 is a diagram illustrating a hardware configuration example of a robot controller and a teach pendant.

FIG. 2 illustrates a hardware configuration example of the robot controller 50 and the teach pendant 30. The robot controller 50 may have a configuration as a common computer in which a memory 52 (such as a ROM, a RAM, and a non-volatile memory), various input/output interfaces 53, an operation unit 54 including various operation switches, and the like are connected to a processor 51 via a bus. The teach pendant 30 may have a configuration as a common computer in which a memory 32 (such as a ROM, a RAM, and a non-volatile memory), a display unit 33, an operation unit 34 formed of an input device such as a keyboard (or a software key), various input/output interfaces 35, and the like are connected to a processor 31 via a bus.

Figure 3:
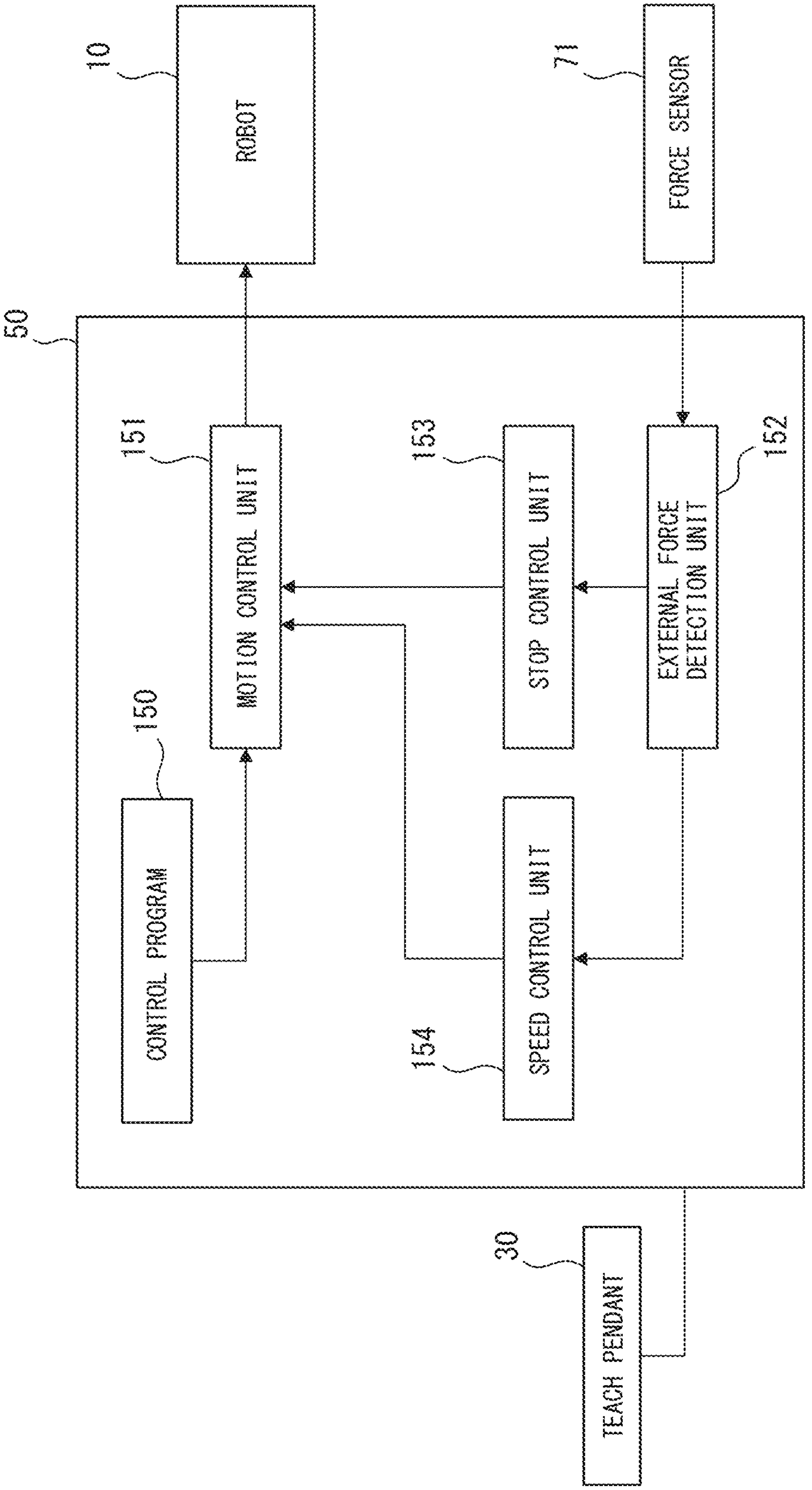
FIG. 3 is a functional block diagram of the robot controller.

FIG. 3 is a functional block diagram of the robot controller 50. The robot controller 50 includes a motion control unit 151, an external force detection unit 152, a stop control unit 153, and a speed control unit 154.

The motion control unit 151 generates a trajectory plan of a predetermined movable portion (such as a tool center point (TCP)) of the robot 10 according to a control program 150 loaded into the robot controller 50, and generates a command of each axis of the robot 10 by kinematic calculation. Then, the robot controller 50 can move a predetermined control portion of the robot 10 according to the planned trajectory by executing servo control on each axis according to the command of each axis. Further, the motion control unit 151 performs control of the hand 60 according to the control program 150.

The external force detection unit 152 can detect an external force (contact force) acting on the robot 10 by subtracting a weight of a workpiece held by the robot 10 and an inertial force generated by a motion of the robot 10 from a detected value output from the force sensor 71. It should be noted that the external force detection unit 152 may also be represented as an external force acquisition unit that acquires an external force based on a detected value of an external force detector such as the force sensor 71.

The stop control unit 153 stops the robot 10 for ensuring human safety when the external force (contact force) detected by the external force detection unit 152 exceeds a reference value. The reference value is set as a threshold value TH1. This configuration ensures human safety in a situation where a person and the robot 10 cooperatively perform the work.

When the robot 10 operates according to the control program, the speed control unit 154 changes a motion speed of the robot 10 in response to detecting that a predetermined external force is applied to the robot 10. In the present embodiment, as an exemplification, when the external force (contact force) detected by the external force detection unit 152 is equal to or less than the threshold value TH1, the speed control unit 154 determines that a worker is operating an arm of the robot 10 with the intention of changing a speed of the robot 10, and changes the speed of the robot 10.

According to the configuration described above, a worker who desires to change a speed of the robot 10 operating at a speed specified by the control program 150 may operate the arm of the robot 10 with a relatively weak force, i.e., a light force equal to or less than the threshold value TH1 of an external force used for determining whether to stop the robot 10. The worker can change the speed of the robot 10 by operating the arm with the light force, and thus the beneficial function for the worker can be used by a simple and convenient operation for the worker. Thus, according to the configuration for changing a speed of the robot 10 when an external force equal to or less than the threshold value TH1 is detected, it is possible to reliably grasp the intention of a worker who desires to temporarily change the speed of the robot 10.

Hereinafter, two specific examples of speed control by the speed control unit 154 when an external force equal to or less than the threshold value TH1 is detected will be described. The two examples described below correspond to a motion of changing a speed of the robot 10 according to a direction of an external force with respect to a motion direction of the robot 10 when application of the external force equal to or less than the threshold value TH1 to the robot 10 is detected.

First Example

A first example is a motion example of reducing a speed of the robot 10 when a worker applies a force equal to or less than a certain value (threshold value TH1) to the robot 10 in a direction considered to be an opposite direction to a motion direction of the robot 10 operating according to the control program 150. In other words, the speed control unit 154 performs control in such a way as to reduce a speed of the robot 10 when the following conditions (A1) and (A2) are satisfied.

(A1) A case where an external force detected by the external force detection unit 152 is equal to or less than the threshold value TH1.

(A2) A case where a direction of an external force applied by the worker is considered to be an opposite direction to a motion direction of the robot 10.

Figure 4:
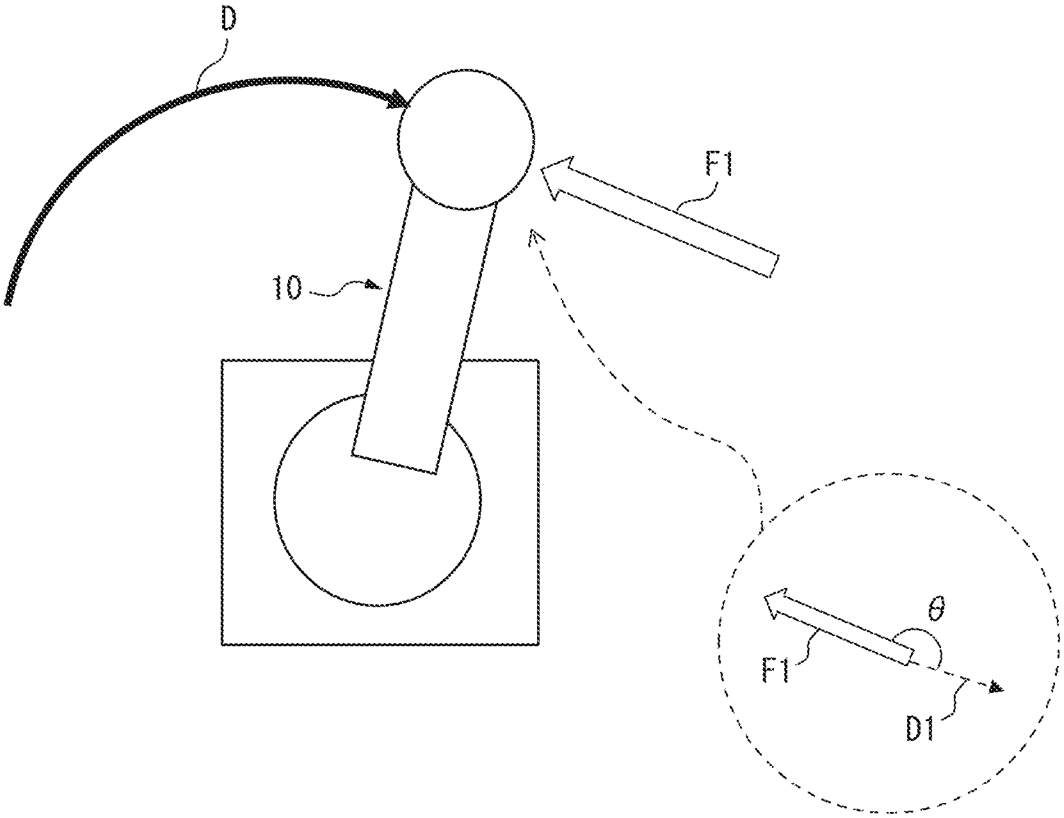
FIG. 4 is a diagram illustrating details of speed control according to a first example.

A motion of the present first example will be described with reference to FIG. 4. FIG. 4 illustrates a state when the robot 10 is viewed from above. In FIG. 4, the robot 10 operates along an arrow D, and the worker operates the robot 10 in such a way as to push back the robot 10 in an illustrated position with an external force F1 equal to or less than the threshold value TH1. A relationship between a motion direction D1 of the robot 10 and the external force F1 in the illustrated position is illustrated in a circle of a broken line on the lower right of FIG. 4.

For example, the following criterion (B1) or (B2) may be used for determining that the condition (A2) described above is satisfied.

(B1) A case where a difference (an angle θ in FIG. 4) between the motion direction D1 of the robot 10 and a direction of the force (external force) F1 applied to the robot 10 by a person falls within a range of 180 degrees±a predetermined value (herein, the predetermined value is a value less than 90 degrees).

(B2) A case where the force F1 applied to the robot 10 by a person includes a component in an opposite direction to the motion direction D1 of the robot.

Both of the criteria can be considered to be a state where the worker applies the force to the robot 10 in a direction considered to be an opposite direction to the motion direction of the robot 10.

The speed control unit 154 reduces a speed of the robot 10 on a condition that application of a force equal to or less than the threshold value TH1 to the robot 10 by the worker is detected in a direction considered to be an opposite direction to a motion direction of the robot 10. Examples of control for reducing a speed may include a motion (C1) or (C2) as follows.

(C1) When an external force equal to or less than the threshold value TH1 is detected in a direction considered to be an opposite direction to a motion direction of the robot, a motion speed of the robot 10 is lowered to a certain speed less than a speed specified by the control program.

(C2) When an external force equal to or less than the threshold value TH1 is detected in a direction considered to be an opposite direction to a motion direction of the robot, a time during which the external force acts is measured, and the degree of decrease in the speed is controlled such that the degree of decrease in the speed is increased as the time during which the external force acts becomes longer. In this case, the worker can increase the degree of decrease in the speed with a longer time of a state where the force is applied to the robot 10.

As described above, according to the first example, the worker can reduce a motion speed of the robot by performing an intuitive and convenient operation of applying, in a direction considered to be an opposite direction to a motion direction of the robot, a force having a magnitude equal to or less than the threshold value TH1 to the robot operating according to the control program. Therefore, the worker can more efficiently perform the cooperative work with the robot according to the situation.

Second Example

A second example is a motion example of increasing a motion speed of the robot 10 when a worker applies a force equal to or less than a certain value (threshold value TH1) to the robot 10 in a direction considered to be the same direction as a motion direction of the robot 10 in a case where the motion speed of the robot 10 temporarily decreases further than a speed specified by the control program 150. In other words, the speed control unit 154 increases a speed of the robot 10 when the following conditions (A11) and (A12) are satisfied.

(A11) A case where an external force detected by the external force detection unit 152 is equal to or less than the threshold value TH1.

(A12) A case where a direction of an external force applied by the worker is considered to be the same as a motion direction of the robot 10.

Figure 5:
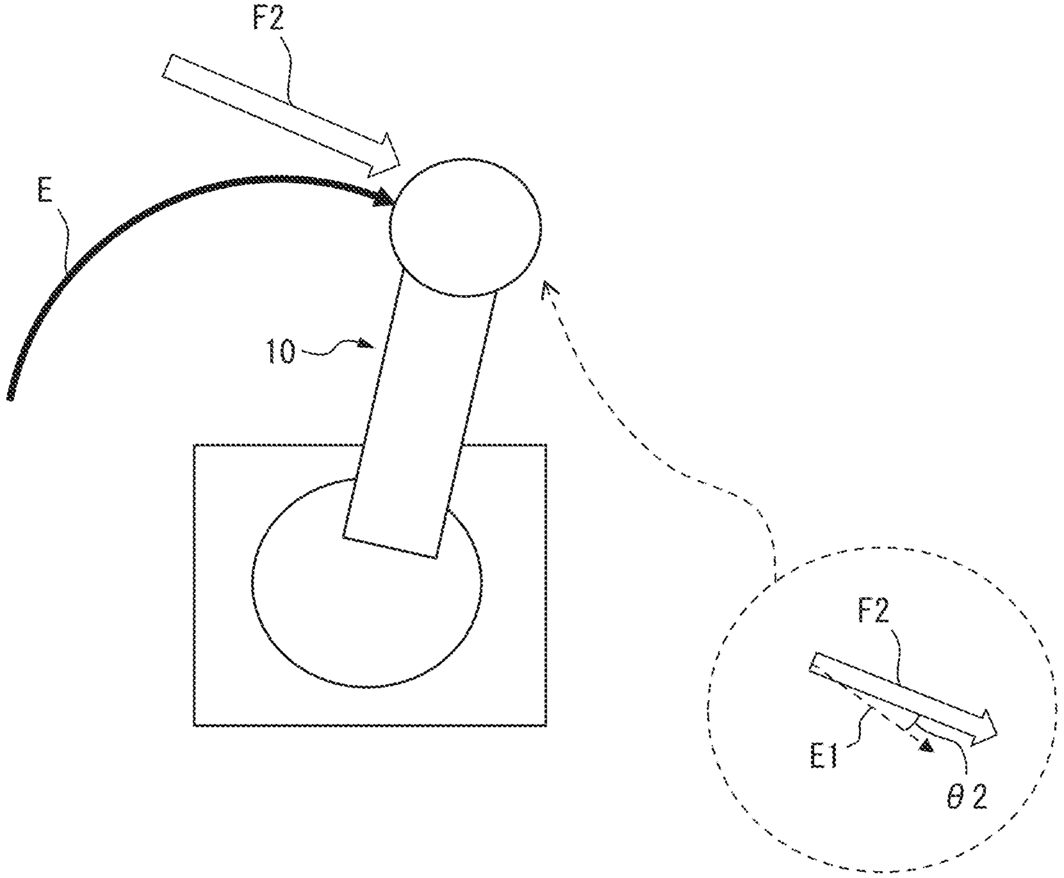
FIG. 5 is a diagram illustrating details of speed control according to a second example.

A motion of the present second example will be described with reference to FIG. 5. In FIG. 5, the robot 10 operates along an arrow E, and the worker operates the robot 10 in a direction considered to be the same as a motion direction of the robot 10 in an illustrated position with an external force F2 equal to or less than the threshold value TH1. A relationship between a motion direction E1 of the robot 10 and the external force F2 in the illustrated position of the robot 10 is illustrated in a circle of a broken line on the lower right of FIG. 5.

For example, the following criterion (B11) or (B12) may be used for determining that the condition (A12) described above is satisfied.

(B11) A case where a difference (an angle θ2 in FIG. 5) between the motion direction E1 of the robot 10 and a direction of the force (external force) F2 applied to the robot 10 by a person falls within a predetermined value (herein, the predetermined value is a value less than 90 degrees).

(B12) A case where the force F2 applied to the robot 10 by a person includes a component in the same direction as the motion direction E1 of the robot.

Both of the criteria can be considered to be a state where the worker applies the force to the robot 10 in a direction considered to be the same as that of the motion direction of the robot 10.

The speed control unit 154 increases a speed of the robot 10 on a condition that application of a force equal to or less than the threshold value TH1 to the robot 10 by the worker is detected in a direction considered to be the same as a motion direction of the robot 10. Examples of control for increasing a speed may include a motion (C11) or (C12) as follows.

(C11) When an external force equal to or less than the threshold value TH1 is detected in a direction considered to be the same as a motion direction of the robot 10, a speed of the robot 10 is restored to a speed specified by the control program 150.

(C12) When an external force equal to or less than the threshold value TH1 is detected in a direction considered to be the same as a motion direction of the robot 10, a time during which the external force acts is measured, and the degree of increase in the speed is controlled such that the degree of increase becomes larger as the time during which the external force acts becomes longer. In this case, the worker can increase the degree of increase in the speed with a longer time of a state where the force is applied to the robot 10.

As described above, according to the second example, the worker can increase or restore a motion speed of the robot by performing an intuitive and convenient operation of applying, in a direction considered to be the same direction as a motion direction, a force having a magnitude equal to or less than the threshold value TH1 to the robot having a temporarily reduced speed. Therefore, the worker can more efficiently perform the cooperative work with the robot according to the situation.

It should be noted that the motion described above according to the second example can also be applied as a motion for temporarily increasing a motion speed of the robot 10 further than a speed specified by the control program.

Figure 6:
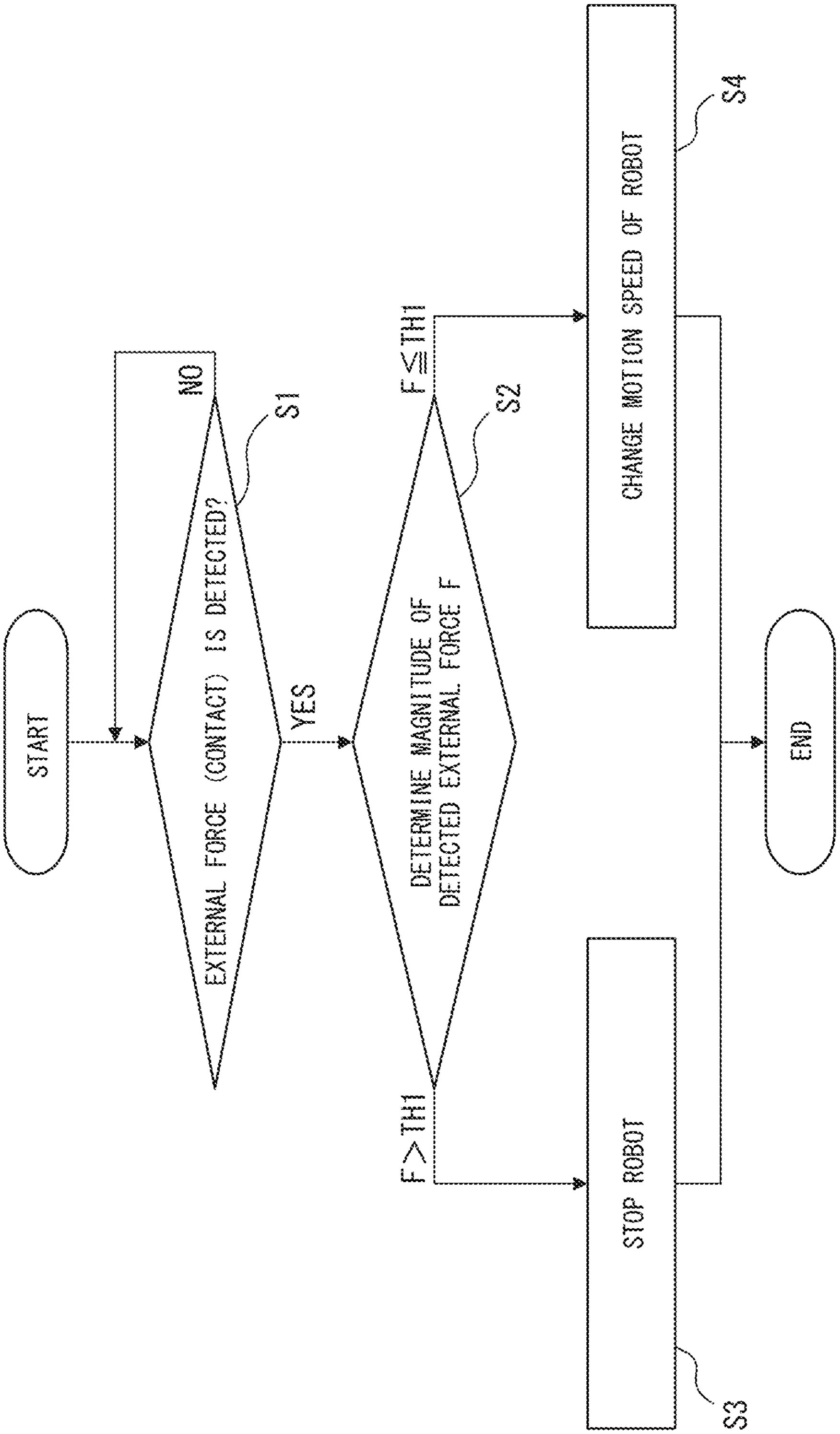
FIG. 6 is a flowchart illustrating speed control processing of a robot executed by the robot controller according to an embodiment.

FIG. 6 illustrates a diagram illustrating, as a flowchart, the above described control method (speed control processing) performed by the robot controller 50. The speed control processing is performed under the control of the processor 51 of the robot controller 50. The speed control processing may be periodically performed during the operation of the robot 10.

As illustrated in FIG. 6, when the robot 10 is operating according to the control program, whether an external force (contact force) acts on the robot 10 is detected by the external force detection unit 152 (step S1). The external force detection unit 152 may appropriately detect whether the external force (contact force) acts on the robot 10 by, for example, determining that the external force (contact force) acts when an output value of the force sensor 71 is equal to or more than a certain value (however, smaller than TH1), in consideration of a noise level of the output value of the force sensor 71 and the like. In step S1, the processing is repeated until the external force is detected (S1: NO).

When the external force (contact force) acting on the robot 10 is detected (S1: YES), the magnitude of the external force (F) is determined (step S2). When the magnitude of the external force (F) exceeds a predetermined reference value (threshold value TH1) (S2: F>TH1), the robot 10 is stopped by the stop control unit 153 for ensuring human safety (step S3).

When the magnitude of the external force (F) is equal to or less than the predetermined reference value (threshold value TH1) (S2: F≤TH1), the speed control unit 154 changes a motion speed of the robot 10 (step S4). In step S4, as described in the first example or the second example described above, the speed control unit 154 can change the motion speed of the robot 10 according to a direction of the external force with respect to a motion direction of the robot 10.

As described above, according to the present embodiment, a motion speed of the robot operating according to the control program can be changed by an operation of applying a force to the robot that is an intuitive and convenient operation for a worker.

The present invention has been described above by using the typical embodiments, but it will be understood by those of ordinary skill in the art that changes, other various changes, omission, and addition may be made in each of the embodiments described above without departing from the scope of the present invention.

For example, in the embodiments described above, the threshold value (first threshold value) for detecting an external force applied in an opposite direction to a motion direction of the robot in the first example, and the threshold value (second threshold value) for detecting an external force applied in the same direction as a motion direction of the robot in the second example are set to be the same value (threshold value TH1), but the first threshold value and the second threshold value may be different values.

The functional block diagram of the robot controller 50 illustrated in FIG. 3 may be achieved by executing various types of software stored in a storage device by the processor 51 of the robot controller 50, or may be achieved by a configuration in which hardware such as an application specific integrated circuit (ASIC) is a main body.

The program for executing various types of processing such as the speed control processing (FIG. 6) in the embodiments described above can be recorded in various computer-readable recording media (for example, a ROM, an EEPROM, a semiconductor memory such as a flash memory, a magnetic recording medium, and an optical disk such as a CD-ROM and a DVD-ROM).

REFERENCE SIGNS LIST

10 Robot
30 Teach pendant
31 Processor
32 Memory
33 Display unit
34 Operation unit
35 Input/output interface
50 Robot controller
51 Processor
52 Memory
53 Input/output interface
54 Operation unit
60 Hand
71 Force sensor
100 Robot system
150 Control program
151 Motion control unit
152 External force detection unit
153 Stop control unit
154 Speed control unit

The invention claimed is:

1. A robot controller configured to control a robot, the robot controller comprising:

a processor configured to:

stop the robot in response to a first external force applied to the robot exceeding a predetermined reference value;

change a motion speed of the robot in response to detection of, as a predetermined external force, a second external force applied to the robot by a user equal to or less than the predetermined reference value when the robot is operating according to a control program; and set a degree of change in the motion speed according to a length of a time during which the predetermined external force is applied to the robot by the user.

2. The robot controller according to claim 1, wherein the processor is configured to change the motion speed of the robot according to a direction of the predetermined external force with respect to a motion direction of the robot in response to the detection of the predetermined external force applied to the robot when the robot is operating according to the control program.

3. The robot controller according to claim 1, wherein the processor is configured to reduce the motion speed of the robot in response to a direction of the predetermined external force applied to the robot being an opposite direction to a motion direction of the robot when the robot is operating according to the control program.

4. The robot controller according to claim 3, wherein the processor is configured to reduce the motion speed of the robot in response to a third external force equal to or less than a first threshold value being detected as the predetermined external force, and a direction of the third external force being an opposite direction to the motion direction of the robot.

5. The robot controller according to claim 1, wherein the processor is configured to increase the motion speed of the robot in response to a direction of the predetermined external force applied to the robot being the same direction as a motion direction of the robot when the robot is operating according to the control program.

6. A robot controller configured to control a robot, the robot controller comprising:

a processor configured to change a motion speed of the robot in response to detection of a predetermined external force being applied to the robot when the robot is operating according to a control program, wherein the processor is configured to increase the motion speed of the robot when a direction of the predetermined external force applied to the robot is considered to be the same direction as a motion direction of the robot in a case where the robot is operating according to the control program, and wherein the processor is configured to increase the motion speed of the robot when an external force equal to or less than a threshold value is detected as the predetermined external force, and a direction of the external force is considered to be the same direction as the motion direction of the robot.

7. A robot controller configured to control a robot, the robot controller comprising:

a processor configured to change a motion speed of the robot in response to detection of a predetermined external force being applied to the robot when the robot is operating according to a control program, wherein the processor is configured to increase the motion speed of the robot when a direction of the predetermined external force applied to the robot is considered to be the same direction as a motion direction of the robot in a case where the robot is operating according to the control program, and wherein, when the robot has reduced a speed to a value lower than a speed specified by the control program, the processor is configured to restore a reduced speed of the robot to the speed specified by the control program in response to detecting that an external force being the predetermined external force and being considered to be in the same direction as the motion direction of the robot is applied to the robot.

8. A control method for controlling a robot by a robot controller, the control method comprising:

stopping the robot in response to a first external force applied to the robot exceeding a predetermined reference value;

changing a motion speed of the robot in response to detection of, as a predetermined external force, a second external force equal to or less than the predetermined reference value being applied to the robot by a user when the robot is operating according to a control program; and setting a degree of change in the motion speed according to a length of a time during which the predetermined external force is applied to the robot by the user.

9. The control method according to claim 8, further comprising:

reducing the motion speed of the robot in response to a third external force equal to or less than a first threshold value being detected as the predetermined external force, and a direction of the third external force being considered to be an opposite direction to a motion direction of the robot when the robot is operating according to the control program.

10. A control method for controlling a robot by a robot controller, the control method comprising:

changing a motion speed of the robot in response to detection of a predetermined external force being applied to the robot when the robot is operating according to a control program; and increasing the motion speed of the robot when an external force equal to or less than a threshold value is detected as the predetermined external force, and a direction of the external force is considered to be the same direction as a motion direction of the robot in a case where the robot is operating according to the control program.

* * * * *